United States Patent Office 3,241,855
Patented Mar. 22, 1966

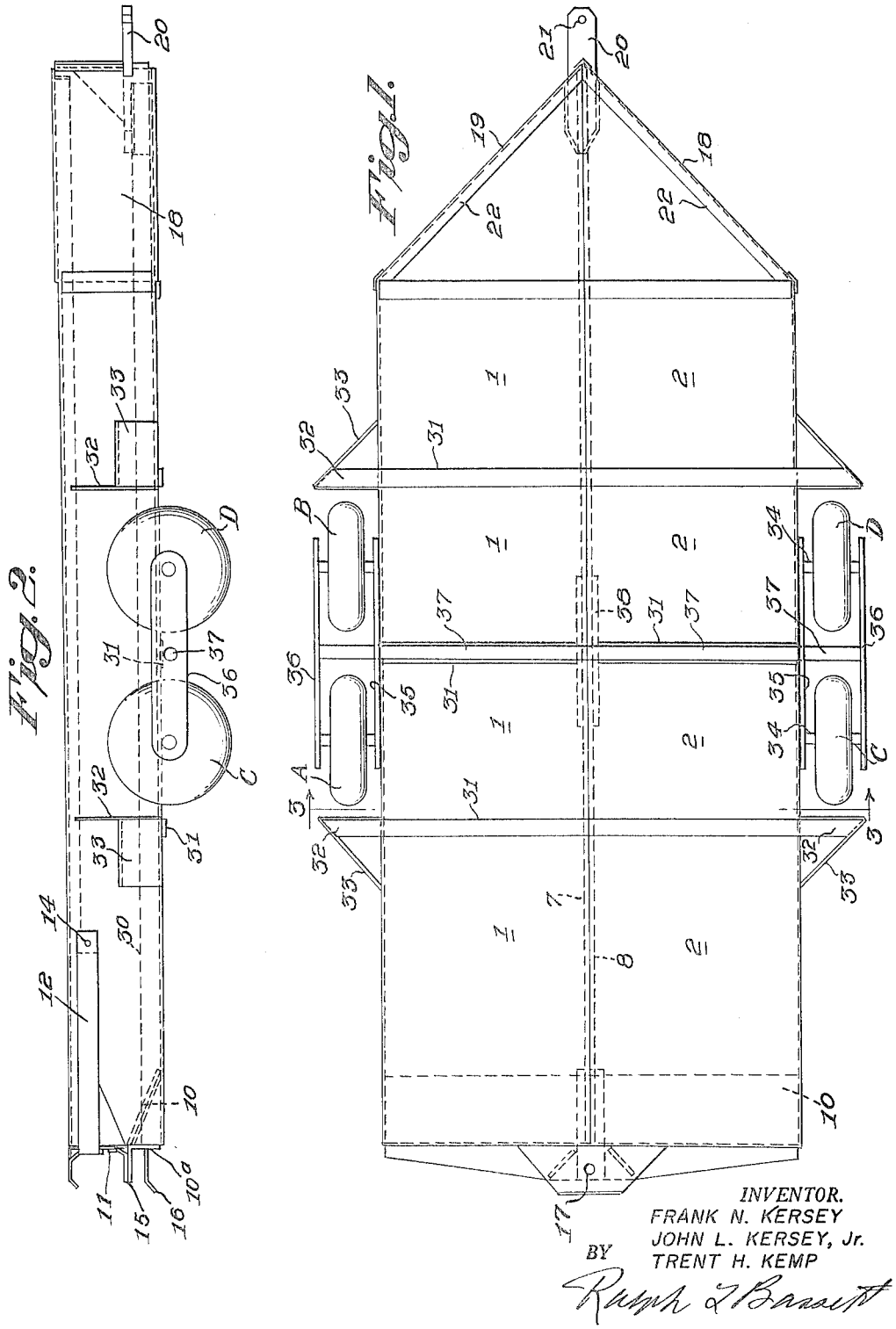

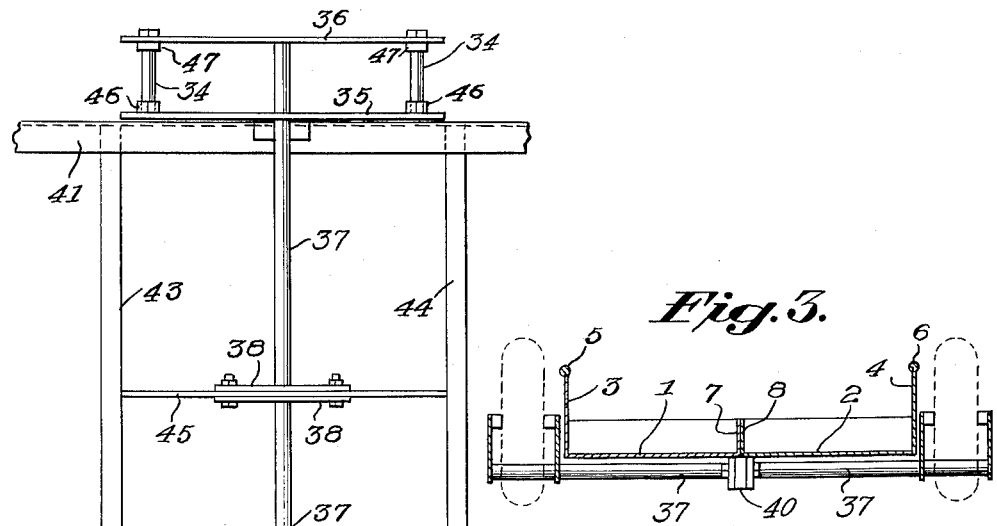
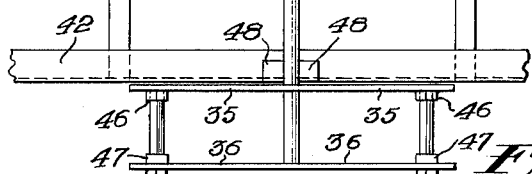
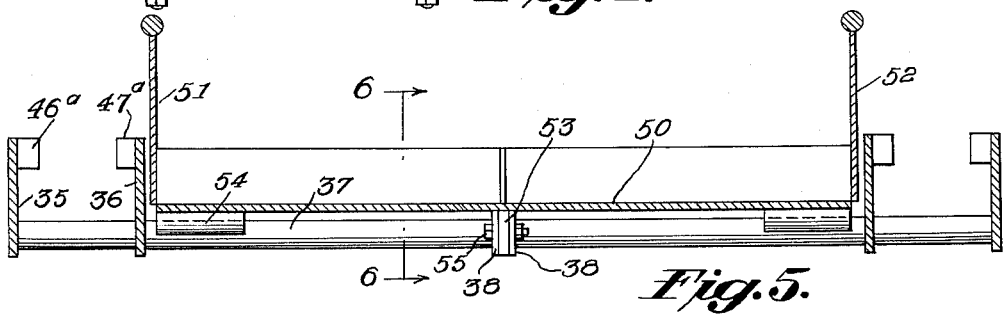
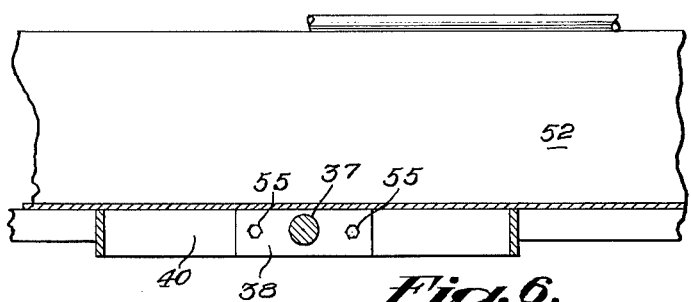
INVENTOR.
FRANK N. KERSEY
JOHN L. KERSEY, Jr.
TRENT H. KEMP INVENTOR.
FRANK N. KERSEY
JOHN L. KERSEY, Jr.
TRENT H. KEMP
BY

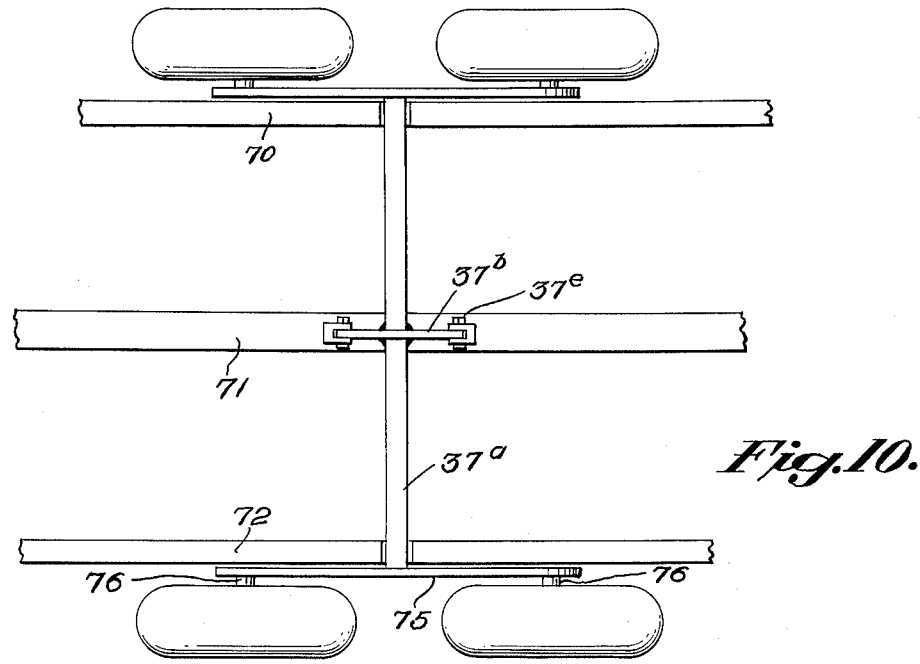
*Fig.10.*
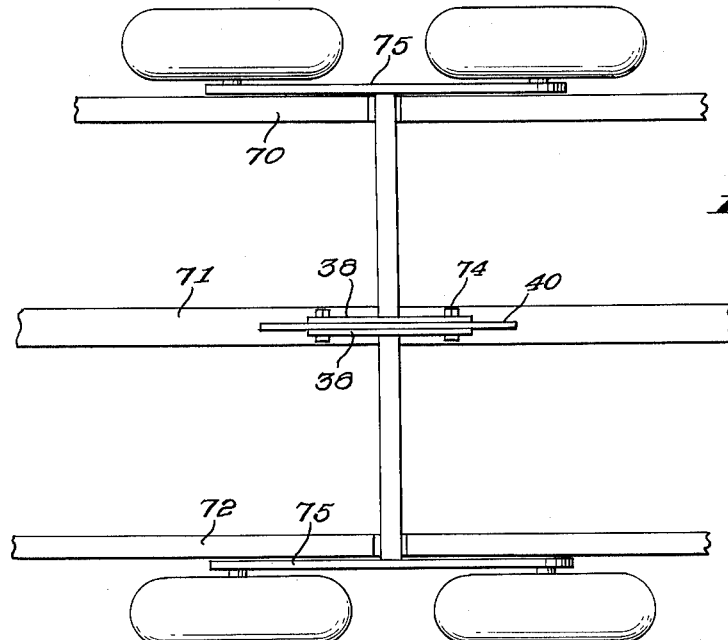
*Fig.11.*
INVENTOR.
FRANK N. KERSEY
JOHN L. KERSEY, Jr.
BY  TRENT H. KEMP

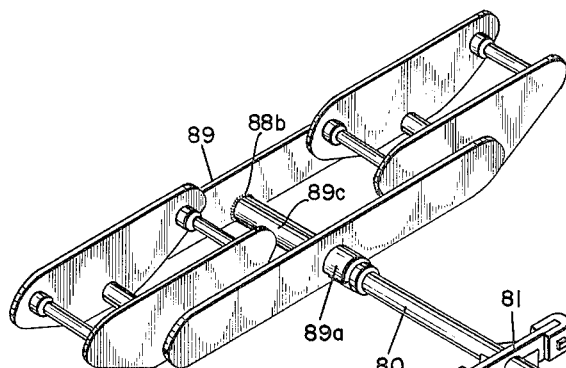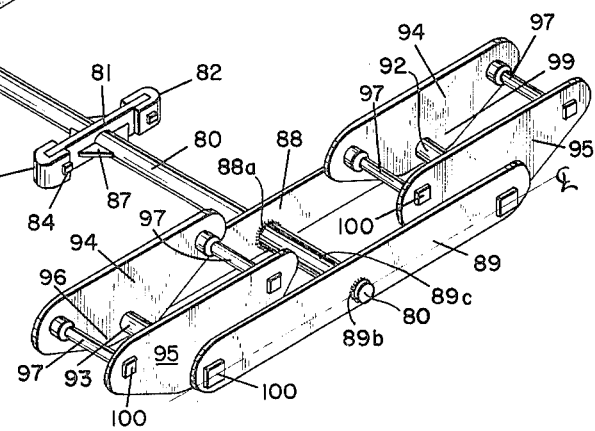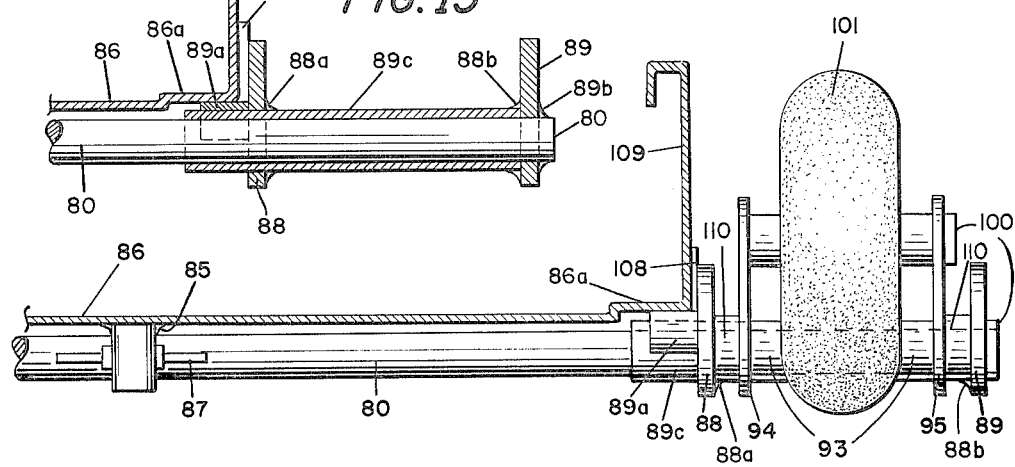

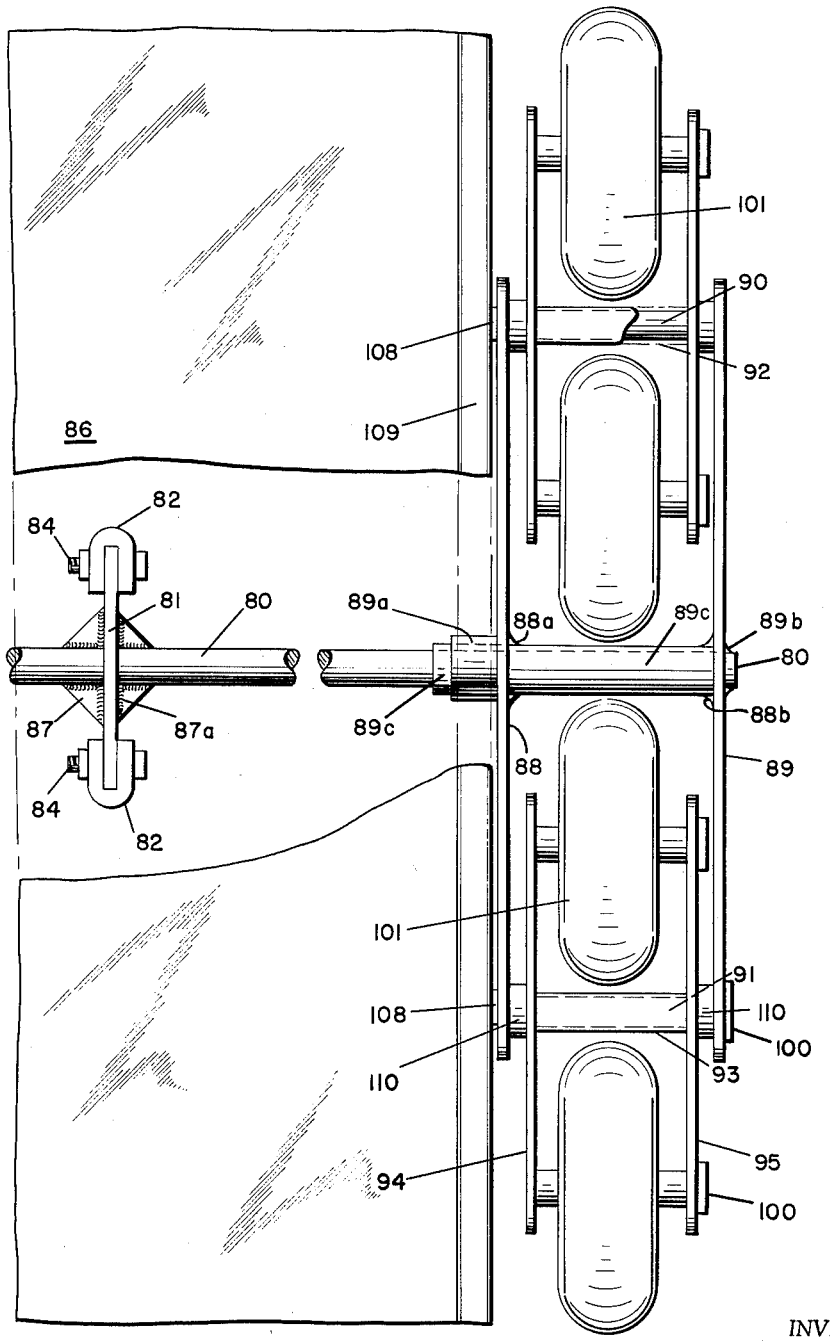

3,241,855
HAULAGE UNITS
Frank N. Kersey, John L. Kersey, Jr., and Trent H. Kemp, Bluefield, Va.; said Frank N. Kersey and said John L. Kersey, Jr., assignors to "Automatic" Sprinkler Corporation of America, Youngstown, Ohio, a corporation of Ohio
Filed Oct. 18, 1963, Ser. No. 317,874
9 Claims. (Cl. 280—104.5)

This invention relates to improvements in haulage units and more particularly to the wheel mountings for such units. The instant application is a continuation-in-part of our co-pending application Serial No. 84,680, filed January 24, 1961.

Generally the invention relates to a vehicle body constructed and arranged for containing maximum weight loads, the vehicle body being capable of containing various bulk or packaged material, or non-yielding materials such as mining supplies and parts or factory equipment and the like, which must be protected against rough handling or load shock.

The main object of the invention is to provide a vehicle body having a novel wheel suspension means including wheel supports embodying torque rods for retaining the wheels in firm supporting contact with the road regardless of the irregularities in the road.

More specifically, the basic concept embodies the use of lateral projecting torque rods having transverse head members forming spaced wheel supports, whereby irregularities in the road will be absorbed by movement of the wheels against the torque in the supporting rods.

Another object of the invention is to provide wheel mountings carried by torque rods, the wheel mountings and the torque rods being removable and replaceable and the wheels per se being individually capable of removal and replacement.

A further object of the invention is to provide means for retaining the wheel supporting torque rods against lateral displacement, this means being so constructed as to permit removal and replacement of the torque rods.

These and other objects of the invention will more clearly hereinafter appear by reference to the accompanying drawings forming a part of the instant specification and wherein like characters of reference designate corresponding parts throughout the several views, in which:

FIG. 1 is a bottom plan view of a haulage unit embodying the invention;

FIG. 2 is a side elevation of the disclosure of FIG. 1;

FIG. 3 is a transverse section of a haulage unit of the type of FIG. 2 in which the axle mounts are in a plane above the torque rods;

FIG. 4 is a fragmentary bottom plan view of another form of framing embodying the invention;

FIG. 5 is a sectional view showing another type of unit body;

FIG. 6 is a longitudinal sectional view on line 6—6 of FIG. 5;

FIGS. 10 and 11 illustrate modified forms of the invention wherein stub axle mountings are provided for the wheels at the outer ends of the torque rods;

Figure 7:
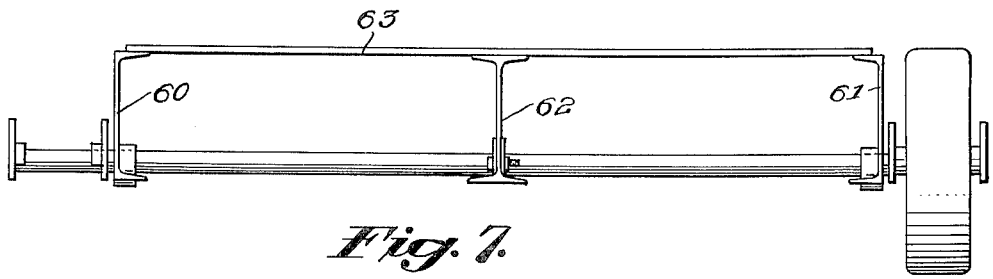
FIG. 7 is a sectional view of a modified form of a hauling unit body including inwardly facing channel side sills.

FIG. 12 discloses the unmounted structural parts of a modified type of assembly utilizing torque suspension providing maximum cushioning effect to facilitate the use of solid type tires;

FIG. 13 is a partial transverse sectional view of the mounting, including the tires, of FIG. 12 associated with a car structure;

FIG. 14 is a bottom plan view showing one-half of the assembly mounted on the bottom of a car structure; and FIG. 15 is a detailed view in section showing the torque rod mountings of FIGS. 12 to 14, inclusive.

In the first form of the invention, the haulage unit is disclosed as embodying a structure in which it is contemplated that more than one unit will be used simultaneously by being coupled through the structure shown. The car structure and the coupling are designed to permit the units to track one another during travel by use of appropriate power, such as a suitable locomotive or tractor.

As best shown in FIG. 3, the first form of the invention is built from a plurality of transversely extending sheets having horizontal floor portions 1 and 2 and upright side wall portions 3 and 4 beaded or flanged at their upper longitudinal edges as at 5 and 6. The floor portions 1 and 2 abut at the center line of the haulage unit or car structure and are flanged vertically as shown at 7 and 8 and are welded together to provide a longitudinally extending floor brace. The floor portion of one end of the haulage unit body is formed with a slope sheet 10 (FIG. 2) for the discharge of lading through the open end of the unit and over the angular end sill structure 10a, there being a closure gate 11 having hinge straps 12 pivoted at 14.

Medially of the discharge end of the unit structure, coupling means are provided including spaced extensions 15 and 16. These spaced extensions are formed at the medial center line of the assembly with vertically aligned openings 17 for a coupling pin. The buff end of the haulage structure is shown as of angle form and including converging plates 18 and 19, these plates meeting at the medial center line of the car and providing for the trackage of the units during haulage. The coupling projection 20, having a pin opening 21 is illustrated for connection with the draft end of the next unit. The buff end of the assembly is shown with angular reinforcing elements 22 and additional provision may be made for strengthening this structure to absorb buff during operation of a plurality of associated vehicles.

The vehicle body may be reinforced by longitudinally extending members 30 and transverse straps 31. Also spaced wing guards for the wheels may be provided at each side of the unit, as shown at 32, having braces 33. Between these laterally projecting wing guards the present concept embodies the use of pairs of spaced supporting wheel assemblies. The wheels of the wheel assemblies are indicated at A, B, C and D and in the form of the invention shown in FIGS. 1, 2 and 3, these wheels are each mounted on axles 34 mounted between spaced plates 35 and 36 rigidly fixed to torque rods 37, each torque rod extending transversely inward to the medial portion of the car body to an elongated winged head anchor plate structure 38 to which it is welded.

Figure 8:
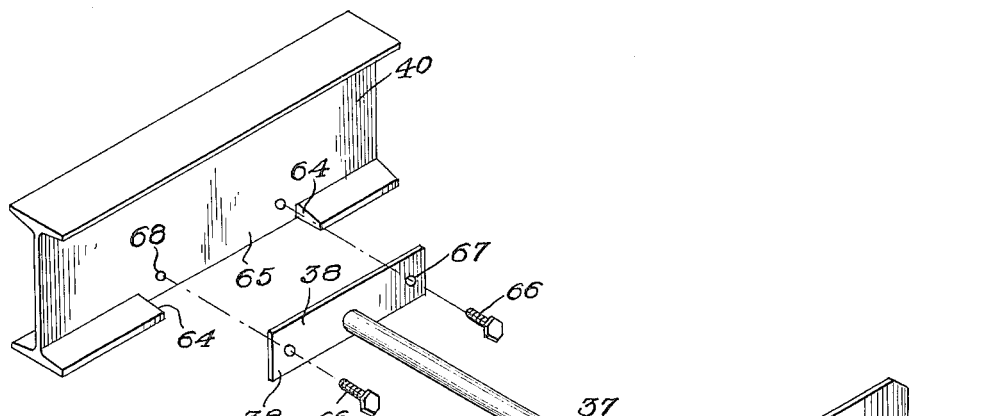
FIG. 8 is an exploded view of one of the wheel supporting torque rod assemblies of the assembly shown in FIG. 7.

The arms of the winged head anchor plate structure 38 of each aligned torque rod are formed with aligned bolt openings (FIG. 8). The anchor plates 38 abut against a depending longitudinally medially positioned flat bar 40 (FIG. 3) welded to the bottom of the car body at its longitudinal medial line. Bolts extend through the anchor plate heads 38 of the torque rods and through the fixed bar 40 to clamp the torque rods in fixed relation to the associated assembly. This inner supporting structure for the torque rods is illustrated in one form in FIGS. 3, 5 and 6 of the drawings and the details of the torque assembly are shown in FIG. 8.

It is to be understood in the disclosures of the instant application that the torque rod assembly 37 in each form of the invention embodies the same general structural elements, i.e. an inner winged head anchor plate mounting structure 38 and outer wheel supporting means including either a single plate or a pair of spaced plates. Where a single wheel supporting plate is to be used at the outer end of the torque rod, then stub axles will be appropiately mounted thereon. Otherwise, with spaced plates, the wheel bearings will be removably mounted therebetween on removable axle pins. With the proposed mounting of the spaced wheels at the outer end of the supporting torque rod, it will be obvious that the wheels will be spring urged into contact with the surface over which the haulage unit is travelling and shocks to the body and to the load in the body will be absorbed in the structure of the torque rods resisting the wheel movements as the latter travel over the uneven surface. This will prevent bumping and jolting which might cause injury to the lading or to the haulage unit structure itself.

In FIG. 4 there is a fragmentary bottom view of a haulage unit frame including angular longitudinally extending side frame members 41 and 42. These members are braced and held rigid by the transverse straps 43 and 44. Extending medially between the straps 44 and 43 is a longitudinally extending rigid frame member 45 to which the inner anchor plate cross heads 38 of the torque rods are shown bolted. The aligned torque rods 37 extend transversely of the assembly and support the spaced wheel carrying plates 35 and 36. A pair of threaded nuts 46 are welded to the outer face of the inner plate 35 and aligned spacers 47 are fixed to the inner face of the outer plate 36, the nuts 46 and the spacers 47 having aligned bores for receiving the axle pins provided for supporting the wheel structure on its bearings.

In the disclosure of FIG. 4 a pair of blocks 48 are shown rigidly fixed to the frame at each side of the torque rod to maintain the same against its lateral displacement. In FIG. 5 the haulage unit structure is of somewhat modified form in that the floor sheets 50 extend from side wall 51 to side wall 52, the latter being formed with a solid upper marginal bead. In this disclosure the anchor plate cross heads 38 of the torque rods 37 are bolted to the elongated rigid depending plate 53 and project laterally to support the fixed rigid wheel supporting plates 35 and 36. In this disclosure it will be noted that the wheel axle pin supporting members 46a and 47a, carried by the plates, are spaced above the longitudinal center of the plates rather than medially thereof. In addition the torque rods 37 are retained against lateral displacement by arcuate holders or guides 54. The holders 54 are semi-circular in cross-section and have their upper portions welded to the bottom face of the haulage unit floor structure and depend from said bottom face at each side of the torque rods. Thus the torque rod is held in a semi-annular elongated socket and will be firmly retained against lateral displacement, although removable in the event it is desired to replace the entire torque rod unit by removal of the bolts 55 which clamp the cross heads 38 to the depending rigid plate 53.

In FIG. 7 the haulage unit is illustrated in transverse section as in the nature of a supply car and is constructed generally of side sills in the form of inwardly facing channels 60 and 61 and a depending center sill of I-beam form at 62. The flanges of the side sills and center sill are flush and support the floor plate 63. As shown in FIG. 8, the bottom flanges of the center sill are cut away as at 64 to present a lower flat area 65 against which the inner anchor plate winged head 38 of the torque rod 37 abuts and is clamped by bolts 66 through the openings 67 and 68. It will be understood that the bolts 66 extend through the head and through the openings 68 in the center sill and into the cross head of the companion torque rod. The outer wheel supporting plates 35 and 36 are illustrated with portions of the axle supporting structure.

Figure 9:
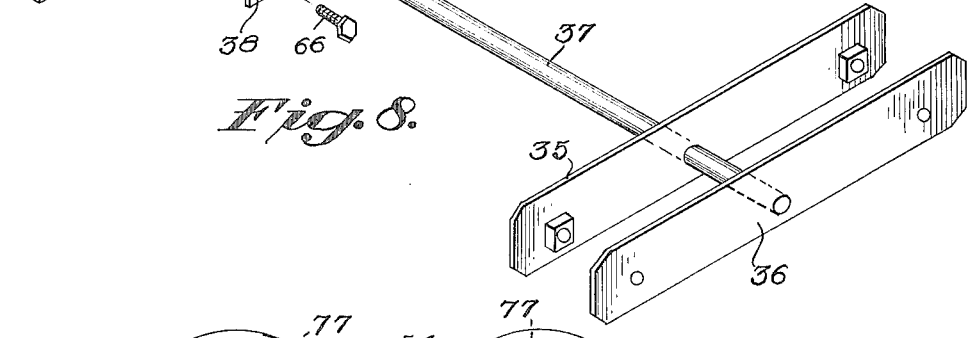
FIG. 9 is a fragmentary elevation illustrating the use of a stop means for limiting torque movement.

In FIGS. 9, 10 and 11 longitudinal haulage unit frame structures are illustrated at 70, 71 and 72, the center sill structure being indicated at 71 and supporting the depending longitudinally medially arranged torque rod supporting means. In FIG. 10 in lieu of a pair of aligned torque rods, one supporting each wheel mounting, a single torque rod is provided at 37a, this torque rod extending entirely across the haulage unit structure and having a plate 37b fixed thereto and projecting fore and aft thereof for connection at 37e to the medial frame element or center sill 71.

The outer ends of the torque rod 37a are provided with a single trunnion plate 75 which is relatively heavy in structure and supports at each end a stub axle 76 upon which the wheels with appropriate bearings are mounted. In the use of the single trunnion plate 75 and stub axles 76 the same general concept is embodied, the main difference being in the specific mounting of the wheels on stub axles rather than on pins between the spaced plates 35 and 36, heretofore described.

FIG. 11 shows the trunnion plate 75 mounted on the separate torque rods by means of the depending rigid longitudinally extending bar 40, as in FIGS. 1 and 2. Referring again to FIG. 9, it will be noted that the semi-circular downwardly facing channel 54 is used to prevent lateral displacement of the torque rod 57 and stop means 77 fixed to the frame structure project outwardly therefrom to engage and limit the swinging movement of the trunnion plate 75 as a result of the twist of the torque rod under impact of the wheels with irregularities in the road over which the haulage unit may travel.

Referring now to FIGS. 12, 13 and 14, the instant invention is modified to increase the torque and to permit the use of solid tires by providing a mechanism wherein the load shocks produced by rough roadways are mechanically absorbed. This structure is particularly useful in that it eliminates the use of pneumatic tires to soften the load and necessarily avoids prevalent troubles present when pneumatic tires are used.

The torque bar 80 extends transversely of the car body and is mounted centrally of the car body with respect to the car length by means of the anchor plate 81 which is of substantial length and is connected to the anchor members or U-clips 82 and 83 by transverse bolts 84. The U-clips 83 are welded as at 85 to the floor plate 86 of the car body, as best shown in FIG. 13. The anchor plate 81 is connected to the U-clips 82 at its outer extremity and at points well spaced from the axis of the torque rod 80. The anchor plate 81 is fixed rigidly to the torque rod 80 by the annular gussets 87, these gussets being welded at their contacting edges to both the anchor plate and the torque rod, as shown by the welds 87a.

It will be noted that the torque rod 80 extends transversely of and projects beyond each side of the car body (one side only shown) and through the spaced main elongated mounting plates 88 and 89. The outer end of the torque rod 80 is welded to the outer face of the outer mounting plate 89, as shown at 89b, whereby the wheel supporting structure applies torque throughout the entire length of the torque rod during movement over rough roads. The torque rod 80 at its outer end portion is housed in a load bearing tube 89c which extends through the elongated mounting plates 88 and 89 below the longitudinal axis of these plates, as shown in FIG. 12. The load bearing tube 89c in addition to forming the load supporting medium confines or restricts the outer end portion of the torque rod against any whipping or lateral distortion and facilitates control of the torque rod when torque is applied thereto.

The elongated bearing tube 89c terminates at its outer end against the inner face of the outer elongated mounting plate 89 and is welded thereto at 88b. The outer face of the inner mounting plate 88 is welded to the bearing tube at 88a. Thus the bearing tube 89c is rigidly affixed at two spaced points, while the torque rod 80 is fixed only at one point and that at the extreme outer end portion so that maximum use of the torque rod is available. The bearing tube 89c projects through the inner mounting plate 88 and extends inwardly beneath the car floor 86, as best shown in FIG. 12, the car floor being upwardly offset or recessed at an area about the bearing tube, as shown at 86a. The recess 86a formed in the car structure provides sufficient area not only for the extremity of the tube 89c but also for the reception of the guide member 89a which is of arcuate shape in cross-section and has its fore and aft walls encompassing approximately one-half of the load bearing tube 89c.

The center portion of the arcuate guide 89a is fixed to the recessed portion 86a of the car floor by welding or otherwise and this assembly maintains the wheels and the wheel mounting assemblies against displacement during operation, as any displacement would tend to apply excessive wear against the side of the car. By securing the torque rod 80 only at its outer end any possibility of rod rupture is minimized as the maximum amount of the rod is subject to the twist rather than a limited amount. The present mounting may be used in any of the forms of the invention shown in this application and is particularly desirable where the vehicles carry substantial loads because of large capacity.

The main mounting plates 88 and 89 are each provided at their lower end portions with transverse rods or bars 90 and 91 which have loosely mounted thereon outer sleeves 92 and 93 which carry wheel carrier assemblies each comprising inner and outer plates 94 and 95. The shape of the wheel carrier plates 94 and 95 is illustrated best in FIG. 12 and each plate includes a downwardly projecting medial portion 96 to which the bars 90 and 91 are affixed. By providing the sleeve connection medially of the length of the plates and downwardly beneath the main plate structure, the wheel axles 97 at each end of the plates are positioned to accommodate an appropriately dimensioned wheel for the road load and still maintain the car body assembly at maximum low level relationship with the roadbed, as best shown in FIG. 13.

As in the other forms of the invention, the individual wheel axles 97 are removable, as well as the entire mounting of the bushing assemblies 90-93, and the mountings involving bolt structures permit removal of the parts, as shown at 100. In fact, all of the parts are removable including the torque rod assemblies and excepting the main mounting plates, one or both of which are welded to the torque rod as shown.

In FIGS. 12 to 15 wear plates 108 are positioned between the outer side face 109 of the car body and the elongated mounting plate 88 to maintain this part against lateral distortion and prevent unnecessary wear and weakening of the side walls of the car. Bushings 110 are also provided at each end of the sleeve mountings 92 and 93 to space the plates 88 and 89 from the wheel carrying plates 94 and 95 so that the wheel assemblies are free to oscillate on their hinged mounting in accordance with road conditions. The wheels 101, shown on the axles in this form of the invention, will preferably use solid-type tires as the cushioning effect because of load shocks is obviously quickly and readily absorbed by the linkage structure illustrated.

The present structure comprehends a novel type of suspension for moving heavy loads at low heights and by mounting the torque rods centrally of the load carrying platform there is an inherent tendency for the structure, both in loaded and unloaded conditions, to maintain a level position under all road conditions. The addition to the avantages and new, novel and unexpected results mentioned, the present structure because of its flexibility and multiple unit assembly elimiantes a large percentage of the torque on the torque bar and thus materially prolongs the life of this part of the assembly. In addition, the tire life is materially lengthentd as the load is evenly distributed on each of the eight tires of a complete assembly.

What we claim is:

1. In a haulage unit, a car having a body structure including side wall portions and a floor, wheel mounting torque rod means extending transversely of the floor and beneath the bottom of the floor medially of the car length, said torque rod means extending laterally beyond the car wall at each side thereof, means anchoring the torque rod means to a medial portion of the car floor, a pair of elongated spaced inner and outer wheel mounting plates mounted on the ends of the torque rod means at each side of the body structure, said mounting means each including a tubular load bearing member enclosing the outer end portions of the torque rod means, said tubular load bearing member being rigidly fixed to each of said wheel mounting plates with the outer end thereof in abutting relation with the inner side of the outer wheel mounting plate and the inner end extending to the adjacent body wall, means fixed to the body structure and projecting to each side of said tubular load bearing member to prevent lateral displacement thereof, and means securing the outer end portion of the torque rod means to the outer side of the outer wheel mounting plate whereby the torque rod means is free throughout its length to its anchoring point at the central portion of the car to absorb torque while restricted against lateral distortion and direct loading forces from the haulage unit, and means for mounting wheels on the respective end portions of said plates.

2. The structure of claim 1 characterized in that the wheel mounting means have their axes parallel to the axis of the torque rod and lie in the same horizontal plane.

3. In a haulage unit, a car having a body structure including side wall portions and a floor, a wheel mounting torque rod extending transversely of the floor and beneath the bottom of the floor medially of the haulage unit length, said torque rod extending laterally beyond the side wall of ech side of said unit, means securing the torque rod to the car floor centrally of its length, a tubular bearing member mounted on the end portions of said torque rod, a pair of elongated relatively heavy main mounting plates rigidly fixed to each of said tubular bearing members, wheel mounting means at each end of said mounting plates, means rigidly securing the tubular bearing members to each of said mounting plates, means securing the outer ends of said torque rod to the outer mounting plate, and means depending from the car and exending adjacent each side wall of said tubular bearing member for maintaining the torque rod assembly in alignment, said wheel mounting means at each end of the mounting plates consists of a pair of plates hinged to the ends of the mounting plates and carrying wheel mounting means at each end located above the hinge means.

4. In a haulage unit, a car having a body structure including side wall portions and a floor, a wheel mounting torque rod extending transversely of the floor and beneath the bottom of the floor medially of the haulage unit length, said torque rod extending laterally beyond the side wall of each side of said unit, means securing the torque rod to the car floor centrally of its length, a tubular bearing member mounted on the end portions of said torque rod, a pair of elongated relatively heavy main mounting plates rigidly fixed to each of said tubular bearing members, wheel mounting means at each end of said mounting plates, means rigidly securing the tubular bearing member to each of said mounting plates, and means non-rotatably securing the outer ends of said torque rod to the outer face of the outer mounting plate, whereby the wheel supporting structure applies torque throughout the entire length of the torque rod during movement over rough roads.

5. In a haulage unit, a car having a body structure including side wall portions and a floor, wheel mounting torque rod means extending transversely of said floor and beneath the bottom of said floor, means for anchoring the torque rod means to the medial bottom portion of the car floor, thereby providing separately acting laterally projecting and independently movable torque rod portions, said torque rod portions each projecting laterally of the sidewalls of the car, wheel mounting means for the projecting torque rod portions including a pair of elongated spaced plates positioned outwardly of the side of the car, said spaced plates being connected to said torque rod medially of their length and extending longitudially of the haulage unit, wheel bearings supported by and extending between the plates at each end portion thereof, said wheel bearing being spaced equi-distant from and at each side of the center of the plates, and wheels removably mounted on said wheel bearings whereby swinging movement of the plates carrying said wheels due to engagement of said wheels with irregular surfaces will cause a twist in a torque rod portion which will be transmitted to each securing means at the medial portion of the haulage unit.

6. The structure of claim 5 characterized in that the pair of spaced plates mounted at the end portions of the torque rod means are supported on a tubular bearing member enclosing the extremities of the torque rod means, said plates being connected to the tubular bearing member and the tubular bearing member being connected at the end portions of the torque rod means.

7. The structure of claim 5 characterized in that the spaced plates are mounted on tubular bearing members enclosing the end portions of the torque rod means, the inner portions of the tubular bearing members projecting beneath the bottom of the car and the outer portions being welded to the terminals of the torque rod means.

8. The structure of claim 5 characterized in that the elongated spaced plates are mounted on tubular bearing members enclosing the end portions of the torque rod means, the tubular bearing members projecting beneath the body of the car and being associated with depending members fixed to the bottom of the car at each side of the tubular bearing members to prevent their lateral movement.

9. In a haulage unit, a car having a body structure including side wall portions and a floor, a wheel mounting torque rod extending transversely of the floor and beneath the bottom of the floor medially of the haulage unit length, said torque rod extending laterally beyond the side wall of each side of said unit, means securing the torque rod to the car floor centrally of its length, a tubular bearing member mounted on the end portions of said torque rod, a pair of elongated relatively heavy main mounting plates rigidly fixed to each of said tubular bearing members, wheel mounting means at each of said mounting plates, means rigidly securing the tubular bearing members to each of said mounting plates, means securing the outer ends of said torque rod to the outer mounting plate, and means depending from the car and extending adjacent each side wall of said tubular bearing member for maintaining the torque rod assembly in alignment, said tubular bearing member being mounted on the end portions of the torque rod projecting beneath the body structure of the haulage unit and the body structure being recessed to receive the tubular bearing member.

References Cited by the Examiner

UNITED STATES PATENTS

| 2,480,934 | 9/1949 | Julien. |
| 2,497,072 | 2/1950 | Cooper. |
| 3,162,464 | 12/1964 | Woolslayer _____ 280—104.5 |

FOREIGN PATENTS

| 134,287 | 9/1949 | Australia. |

BENJAMIN HERSH, *Primary Examiner.*

MILTON BUCHLER, *Examiner.*

P. GOODMAN, *Assistant Examiner.*